US011169325B2

(12) United States Patent
Guerber et al.

(10) Patent No.: US 11,169,325 B2
(45) Date of Patent: Nov. 9, 2021

(54) FILTERING DEVICE IN A WAVEGUIDE

(71) Applicant: STMicroelectronics (Crolles 2) SAS, Crolles (FR)

(72) Inventors: Sylvain Guerber, Isere (FR); Charles Baudot, Lumbin (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 3 days.

(21) Appl. No.: 16/295,929

(22) Filed: Mar. 7, 2019

(65) Prior Publication Data

US 2019/0285799 A1    Sep. 19, 2019

(30) Foreign Application Priority Data

Mar. 15, 2018  (FR) ...................................... 1852246

(51) Int. Cl.
*G02B 6/122* (2006.01)
*G02B 6/12* (2006.01)
*G02B 6/14* (2006.01)

(52) U.S. Cl.
CPC .......... *G02B 6/1228* (2013.01); *G02B 6/122* (2013.01); G02B 6/12002 (2013.01); G02B 6/14 (2013.01); G02B 2006/12088 (2013.01); G02B 2006/12109 (2013.01)

(58) Field of Classification Search
CPC ........ G02B 6/1228; G02B 6/122; G02B 6/14; G02B 6/12002; G02B 6/12; G02B 2006/12088; G02B 2006/12002; G02B 2006/12109
See application file for complete search history.

(56) References Cited

U.S. PATENT DOCUMENTS

| 5,065,123 | A  | * | 11/1991 | Heckaman | ................ H01P 1/16 |
| | | | | | 333/246 |
| 9,793,589 | B2 | * | 10/2017 | Kai | ......................... H01P 1/207 |
| 10,263,310 | B2 | * | 4/2019 | Kildal | ...................... H01P 3/123 |
| 2004/0251992 | A1 | * | 12/2004 | Kim | ....................... H01P 3/122 |
| | | | | | 333/208 |
| 2007/0120628 | A1 | * | 5/2007 | Jun | ....................... H01P 1/2088 |
| | | | | | 333/208 |

(Continued)

FOREIGN PATENT DOCUMENTS

| EP | 1777775 A1 | 4/2007 |
| EP | 3252866 A1 | 12/2017 |

(Continued)

OTHER PUBLICATIONS

First Office Action and Search Report from co-pending CN Appl. No. 201910192167.5 dated Mar. 31, 2020 (6 pages).

(Continued)

*Primary Examiner* — Ryan A Lepisto
*Assistant Examiner* — Erin D Chiem
(74) *Attorney, Agent, or Firm* — Crowe & Dunlevy

(57) ABSTRACT

An optical waveguide is configured to propagate a light signal. Metal vias are arranged along and on either side of a portion of the optical waveguide. Additional metal vias are further arranged along and on either side of the optical waveguide both upstream and downstream of the portion of the optical waveguide. The metal vias and additional metal vias are oriented orthogonal to a same plane, the same plane being orthogonal to a transverse cross-section of the portion of the optical waveguide.

37 Claims, 2 Drawing Sheets

(56) References Cited

U.S. PATENT DOCUMENTS

| | | | |
|---|---|---|---|
| 2007/0263957 A1* | 11/2007 | Shimizu | G02B 6/12004 385/14 |
| 2008/0197362 A1* | 8/2008 | Hisamoto | H01L 33/34 257/86 |
| 2011/0181373 A1 | 7/2011 | Kildal | |
| 2014/0029892 A1 | 1/2014 | Pomerene et al. | |
| 2014/0286606 A1 | 9/2014 | Takahashi | |
| 2015/0270414 A1 | 9/2015 | Pomerene et al. | |
| 2017/0090118 A1 | 3/2017 | Sodagar et al. | |

FOREIGN PATENT DOCUMENTS

| | | | |
|---|---|---|---|
| GN | 103682534 A | 3/2014 | |
| GN | 106785290 A | 5/2017 | |
| JP | H06300933 A | 10/1994 | |
| JP | H1172633 A | 3/1999 | |
| KR | 1020050092286 A | 9/2005 | |
| WO | 2010003808 A2 | 1/2010 | |

OTHER PUBLICATIONS

Yongle Wu et al: "Dual-Band Dual-Mode Substrate Integrated Waveguide Filters with Independently Reconfigurable TE101 resonant Mode", Scientific Reports, vol. 6, No. 1, Aug. 26, 2016 (Aug. 26, 2016), XP055399843, DOI: 10.1038/srep31922 *abrégé* * figure 1.

INPI Search Report and Written Opinion for FR 1852246 dated Feb. 11, 2018 (12 pages).

Huang Yong Mao et al: "Small-reflected substrate integrated waveguide termination with multi-step shape and absorbing material", 2017 IEEE International Symposium on Antennas and Propagation & USNC/URSI National Radio Science Meeting, IEEE, Jul. 9, 2017 (Jul. 9, 2017), pp. 2605-2606, XP033230543, DOI: 10.1109/APUSNCURSINRSM.2017.8073345 [extrait le Oct. 18, 2017] *abrégé* *figure 2.

Second Office Action and Search Report for co-pending CN Appl. No. 201910192167.5 dated Oct. 16, 2020 (5 pages).

* cited by examiner

FILTERING DEVICE IN A WAVEGUIDE

PRIORITY CLAIM

This application claims the priority benefit of French Application for Patent No. 1852246, filed on Mar. 15, 2018, the content of which is hereby incorporated by reference in its entirety to the maximum extent allowable by law.

TECHNICAL FIELD

The present disclosure relates to the field of waveguides, and more particularly waveguides for integrated photonic (optical and/or optoelectronic) circuits.

BACKGROUND

In an integrated photonic circuit, a light signal may be transmitted by a waveguide. The dimensions of the transverse cross-section of the waveguide are currently selected so that a given optical mode of the signal, generally the transverse electric (TE) and/or transverse magnetic (TM) fundamental mode, is the guided mode propagating through the waveguide. However, when such a guided mode propagates through the waveguide, inhomogeneities in the waveguide material and/or variations in the waveguide geometry, for example, when the waveguide exhibits a bend or is coupled to another waveguide, may cause the occurrence of parasitic optical modes in the waveguide, that is, of optical modes of higher order when the guided mode is the fundamental mode. Such parasitic modes may disturb the operation of the integrated circuit, particularly due to the fact that they are not guided and radiate outside of the waveguide.

To avoid such disturbances, the waveguide may be associated with a parasitic mode filtering device. Such a filtering device should have a relatively limited impact, or even no impact, on the transmission of the guided optical mode.

It would be desirable to have a device for filtering the parasitic modes of a signal propagating through a waveguide which overcomes at least some of the disadvantages of known filtering devices. In particular, it would be desirable to have such a filtering device for a waveguide formed in an insulating layer of an interconnection structure of an integrated photonic circuit.

SUMMARY

In an embodiment, a device includes an optical waveguide and metal vias arranged along and on either side of a portion of the optical waveguide.

According to an embodiment, the dimensions of the transverse cross-section of the portion of the waveguide are substantially equal to the dimensions of a transverse cross section corresponding to a minimum effective area of a guided optical mode for the light signal to be propagated through the waveguide.

According to an embodiment, the metal vias are configured to absorb less than 5% of the power of a guided optical mode to be propagated through the waveguide.

According to an embodiment, in a plane orthogonal to the vias, the distance between the vias and the portion of the waveguide is shorter than a maximum distance beyond which the power of a parasitic optical mode is lower than approximately −60 dB, when a light signal propagates through the waveguide.

According to an embodiment, in a plane orthogonal to the vias, the distance between the vias and the portion of the waveguide is shorter than a maximum distance equal to approximately 1.7 µm.

According to an embodiment, the device also includes metal vias along and on either side of the waveguide upstream and downstream of the portion of the waveguide.

According to an embodiment, the vias which run along the waveguide upstream of the portion of the waveguide are configured so that the effective index of a guided optical mode of the light signal to be propagated through the waveguide varies progressively all the way to the portion of the waveguide.

According to an embodiment, the vias are orthogonal to a same plane, the plane being orthogonal to the transverse cross section of the portion of the waveguide.

According to an embodiment, the device also includes a metal strip parallel to a plane orthogonal to the vias, arranged at least partly opposite the portion of the waveguide and configured to at least partly absorb a parasitic optical mode radiated from the portion of the waveguide when the light signal propagates through the waveguide.

According to an embodiment, the device also includes a strip of a material absorbing at the wavelengths of the light signal to be transmitted by the waveguide, the strip of the absorbing material being parallel to a plane orthogonal to the vias, at least partly arranged opposite the portion of the waveguide and configured to at least partly absorb a parasitic optical mode radiated from the portion of the waveguide when the light signal propagates through the waveguide.

According to an embodiment, the metal vias running along the portion of the waveguide are configured to at least partly absorb a parasitic optical mode radiated from the portion of the waveguide when the light signal propagates through the waveguide.

According to an embodiment, the portion of the waveguide extends between two additional portions of the waveguide, the two additional portions being configured so that the effective index of the guided optical mode to be propagated through the waveguide progressively varies all the way to the portion of the waveguide.

Another embodiment provides an integrated photonic circuit including a device such as defined hereabove.

According to an embodiment, the circuit includes an interconnection structure, the waveguide being embedded in an insulating layer of the interconnection structure.

According to an embodiment, the waveguide is made of silicon nitride and the insulating layer is made of silicon oxide.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
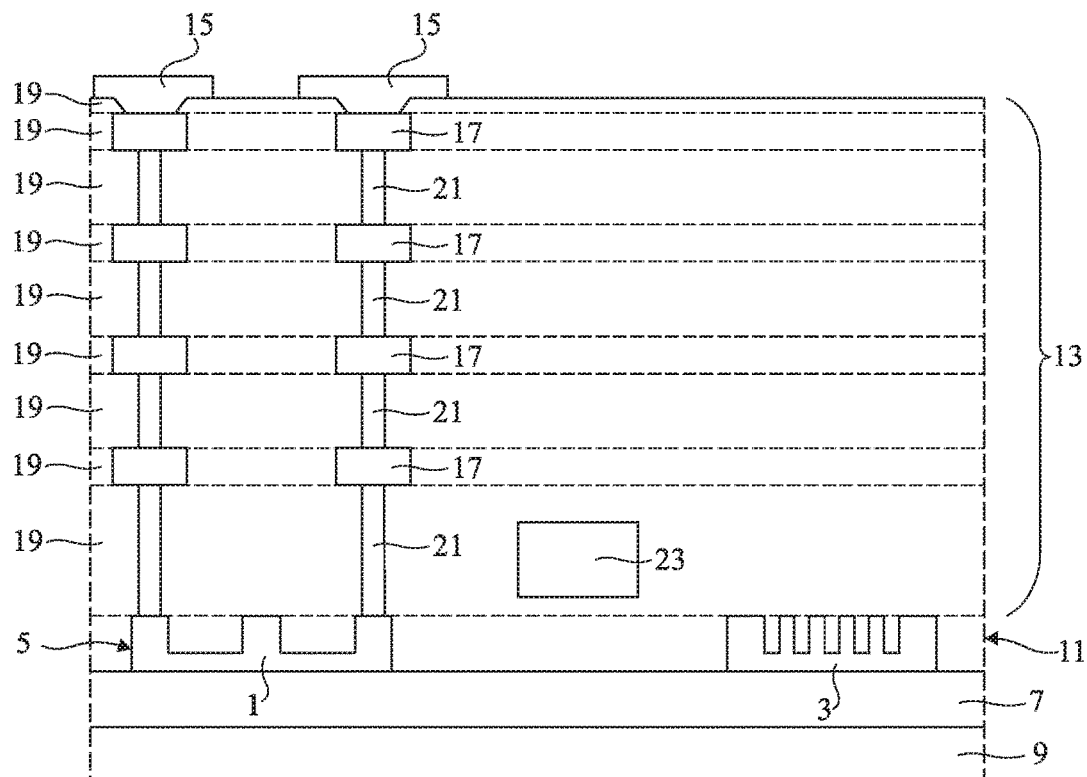
FIG. 1 is a simplified cross-section view of an example of an integrated photonic circuit.

The same elements have been designated with the same reference numerals in the various drawings and, further, the various drawings are not to scale. For clarity, only those steps and elements which are useful to the understanding of the described embodiments have been shown and are detailed. In particular, the integrated photonic circuits where filtering devices may be provided have not been described, the filtering devices described hereafter being compatible with the waveguides of usual photonic circuits.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred to the orientation of the drawings. The terms "approximately", "substantially", "about", and "in the order of" are used herein to designate a tolerance of plus or minus 10%, preferably (but not necessarily) of plus or minus 5%, of the value in question.

In the following description, when reference is made to a transverse cross-section of a waveguide, the transverse cross section is orthogonal to the longitudinal direction of the waveguide.

FIG. 1 is a partial simplified cross-section view of an integrated photonic circuit.

The integrated photonic circuit comprises various optoelectronic and/or optical elements, for example, a phase modulator 1 and a coupling network 3, formed from a semiconductor layer 5 of a silicon on insulator (SOI) type laid on an insulating layer 7 arranged on a support 9 such as a silicon substrate. Components 1, 3 of the circuit are arranged on insulating layer 7 and are covered with an insulating layer 11.

An interconnection structure 13 coats layer 11 to electrically couple circuit components together and/or to contact pads 15, for example, arranged at the level of the upper surface of interconnection structure 13. Interconnection structure 13 comprises portions 17 of metal layers separated by insulating layers 19, and metal vias 21 crossing certain insulating layers 19 to electrically couple portions 17 together, to integrated circuit components, and/or to contact pads 15. In this example, interconnection structure 13 comprises four metallization levels, each metallization level comprising the portions 17 of a same metal layer.

A waveguide 23, for example, having a rectangular cross section, is arranged in layer 19 separating components 1, 3 of the photonic circuit of the lower metallization level of the interconnection structure, that is, the metallization level closest to these components.

As an example, in the following description, a waveguide comprising, perpendicularly to its longitudinal direction, a rectangular transverse cross-section having a width measured between the two lateral (side) surfaces of the waveguide, and having a height measured between the upper and lower surfaces of the waveguide, is considered. It is also considered as an example that the waveguide is configured to guide the electric transverse and/or magnetic transverse fundamental mode of a light signal having a wavelength or wavelengths which are in the near infrared range, for example in the range from 1 to 2 µm, preferably equal to approximately 1.3 µm or approximately 1.55 µm, for example equal to 1.3 µm or 1.55 µm.

Figure 2A:
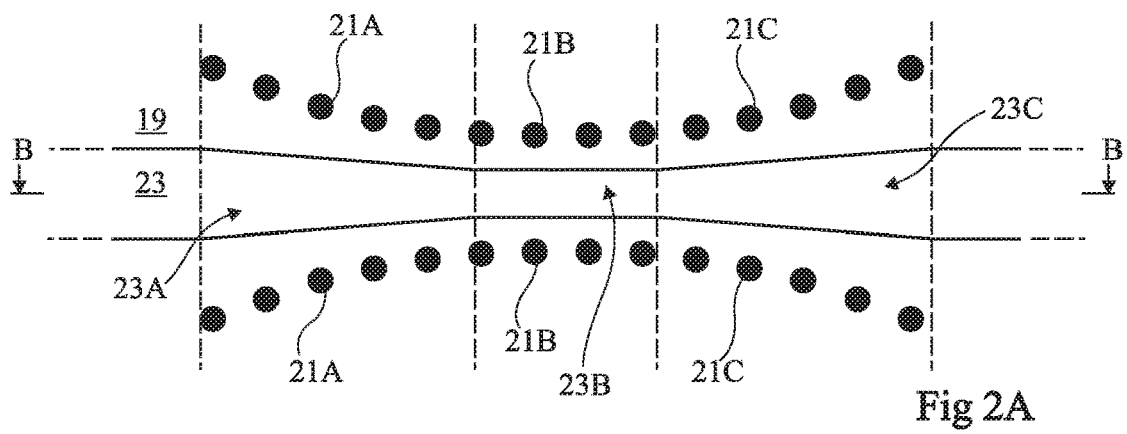
FIGS. 2A and 2B schematically show an embodiment of a filtering device.
Figure 2B:
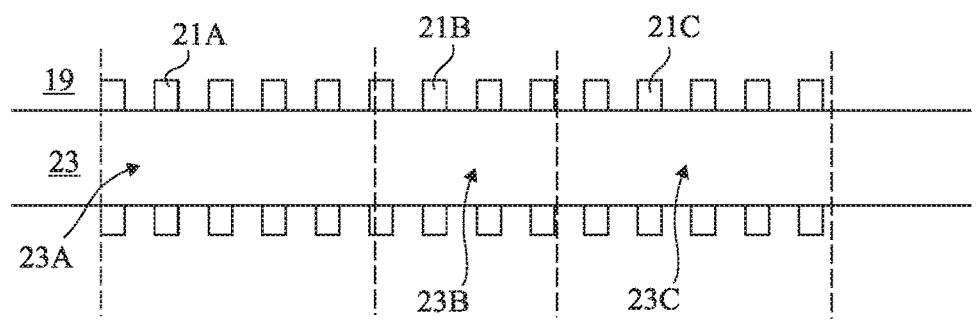

FIGS. 2A and 2B schematically show an embodiment of a filtering device associated with the waveguide 23 of FIG. 1. FIG. 2A is a top view of the device, FIG. 2B being a cross section view in plane BB of FIG. 2A.

Waveguide 23 comprises, lengthwise, a portion 23B between portions 23A and 23C, portions 23A, 23B, and 23C (delimited by vertical dotted lines in FIGS. 2A and 2B) being in contact two by two (i.e., they are contiguous structures). In this example, portions 23A, 23B, and 23C have the same height (measured vertically in FIGS. 1 and 2A). Further, portion 23B here has a constant transverse cross section (width) along its entire length.

The dimensions of the transverse cross-section of portion 23B are substantially equal to those of a transverse cross-section corresponding to a minimum effective area for the considered guided optical mode, that is, to a maximum confinement of this optical mode, where one of these dimensions may be fixed, as is the case for height in the present example. The effective area $A_{\mathit{eff}}$ of an optical mode is defined by:

$$A_{\mathit{eff}} = \frac{\left[\iint_{-\infty}^{\infty} |E(x,y)|^2 dxdy\right]^2}{\iint_{-\infty}^{\infty} |E(x,y)|^4 dxdy}$$

with x and y being the dimensions of the waveguide in a transverse plane (here, the width and the height of the waveguide) and E being the distribution of the electric field of the considered optical mode.

Vias 21B are arranged on either side of portion 23B, along the length of the portion 23B. In this example, a series of vias 21B is arranged along each of the lateral surfaces of portion 23B. Vias 21B are, for example, substantially orthogonal to the plane of FIG. 2A, that is, to a plane orthogonal to vias 21B and to the transverse cross-sections of waveguide 23 in this example. Preferably, vias 21B extend lengthwise along at least the entire height of portion 23B. Preferably, in the plane of FIG. 2A, a substantially constant distance, preferably constant, separates two successive vias 21B.

Advantage is here taken from the fact that vias 21B may be identical to vias 21 (FIG. 1) between the lower metallization level of interconnection structure 13 and the components of the photonic circuit. Thus, vias 21B and 21 may be formed simultaneously, without providing additional manufacturing steps with respect to those used in the manufacturing of the circuit of FIG. 1.

Vias 21B are preferably arranged at a distance from portion 23B such that a minimum quantity, for example, less than 5%, preferably less than 1%, of the power of the considered guided mode, is absorbed by vias 21B when a light signal propagates in portion 23B. Vias 21B are arranged at a distance from portion 23B such that all or part of the power of the parasitic modes radiated from portion 23B, in particular from the lateral surfaces of portion 23B, is absorbed by vias 21B when a light signal propagates in portion 23B. For example, in the plane of FIG. 2A, vias 21B are arranged at a distance from waveguide 23 shorter than or equal to a maximum distance beyond which it is considered that the vias no longer have an impact on the radiated parasitic mode(s) to be filtered, for example a maximum distance beyond which the power of the considered parasitic mode(s) is shorter than approximately −60 dB, preferably −60 dB. As an example, the maximum distance is equal to approximately 1.7 µm, more preferably equal to 1.7 µm.

Thus, when a light signal propagates in portion 23B, the guided mode is relatively little disturbed by vias 21B due to its confinement in portion 23B. Further, the power of a parasitic mode to be filtered decreases as the signal runs through portion 23B due to the fact that the parasitic mode radiates from this portion and that it is at least partially absorbed by vias 21B. As a result, the parasitic mode is filtered by portion 23B and vias 21B.

In the embodiment shown in FIGS. 2A and 2B, the transverse cross-sectional area of each of portions 23A and 23C decreases toward portion 23B. In other words, at least one of the dimensions of the transverse cross-section, in this example the width of the transverse cross-section, decreases all the way to end 25. Indeed, a waveguide 23 having a transverse cross section with dimensions, here a width, greater than those of portion 23B to limit propagation losses which are greater in a transverse cross-section corresponding to a minimum effective area for the considered guided optical mode, will generally be selected.

In this embodiment, vias 21A are arranged on either side of and along waveguide 23, upstream of portion 23B, for example, on either side of and along portion 23A, and vias 21C are arranged on either side of and along the waveguide, downstream of portion 23B, for example, on either side of and along portion 23C. More particularly in this example, a series of vias 21A is arranged along each of the lateral surfaces of portion 23A and a series of vias 21C is arranged along each of the lateral surfaces of portion 23C. Preferably, the series of vias 21A and 21C are arranged as an extension of the series of vias 23B. Vias 21A and 21C are for example substantially orthogonal to the plane of FIG. 2A. Vias 21A and 23C are preferably identical to vias 21B and can then be formed at the same time as vias 21 (FIG. 1). As an example, in the plane of FIG. 2A, a substantially constant distance, preferably constant, separates two successive vias 21A or 21C, this distance being, for example, equal to that which separates two successive vias 21B.

Preferably, the dimensions of portion 23A and/or the arrangement of vias 21A with respect to portion 23A are such that the effective index of an optical mode which propagates in portion 23A, toward portion 23B, progressively varies all the way to portion 23B. Similarly, the dimensions of portion 23C and/or the arrangement of vias 21C with respect to portion 23C are preferably such that the effective index of an optical mode which propagates in portion 23C, from portion 23B, progressively varies from portion 23B. The optical index of an optical mode is defined as the ratio of the propagation constant of this optical mode to the wave vector in vacuum at the considered wavelength. The progressive variation of the effective index all the way to portion 23B enables decreasing of the power of the guided optical mode which is reflected by portion 23B and to limit, or even to suppress, the occurrence of parasitic optical modes in the device. As an example, in the plane of FIG. 2A, the distance between vias 21A, respectively 21C, and portion 23A, respectively 23C, increases as the distance from portion 23B increases, vias 21A and 21C being for example arranged to follow the contour of a circular function.

The dimensions of portions 23A, 23B, and 23C, as well as the arrangement of vias 23A, 23B, and 23C relative to these portions may be determined by those skilled in the art based on the functional indications provided hereabove. For this purpose, those skilled in the art may use simulation tools, for example, simulation tools exploiting finite difference time domain calculations (FDTD). An example of such a simulation tool is provided by the company called "Lumerical".

Figure 3A:
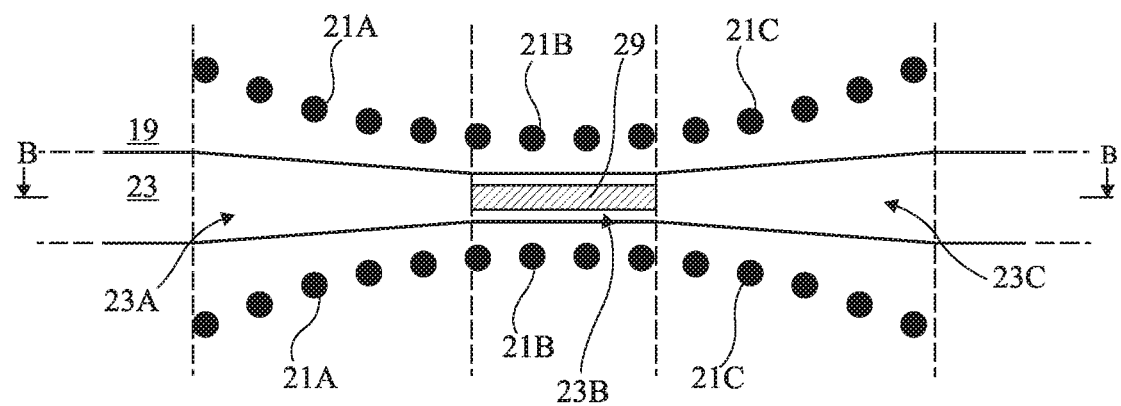
FIGS. 3A and 3B schematically show an alternative embodiment of the device of FIGS. 2A and 2B.
Figure 3B:
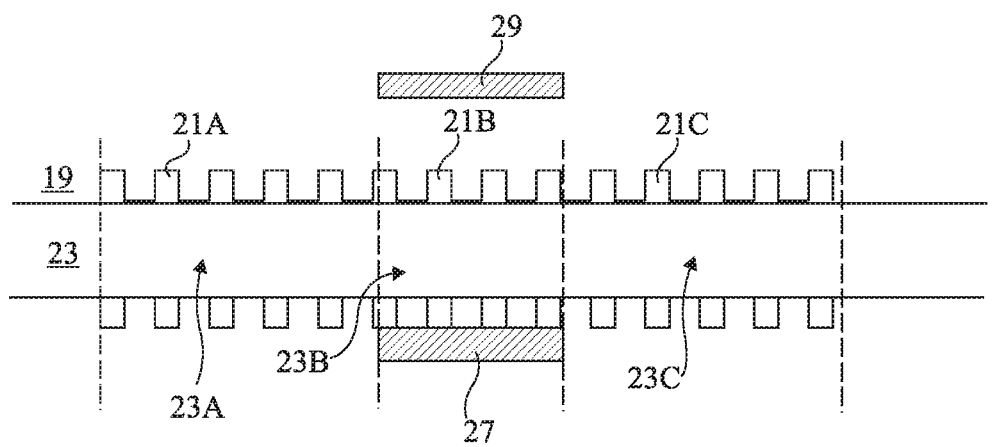

FIGS. 3A and 3B schematically show an alternative embodiment of the device of FIGS. 2A and 2B, FIG. 3A being a top view and FIG. 3B being a cross-section view along plane BB of FIG. 3A.

As compared with the device of FIGS. 2A and 2B, the device of FIGS. 3A and 3B further comprises a strip 27 (not shown in FIG. 3A) made of a material absorbing light at the considered wavelengths, for example, germanium, doped silicon, or a silicide. Strip 27 is arranged at least partly opposite portion 23B, in the present example under portion 23B opposite the lower surface of portion 23B. Strip 27 is here parallel to the plane of FIG. 3A, that is, a plane orthogonal to vias 21B and to the transverse cross-sections of the waveguide. Strip 27 extends lengthwise parallel to the longitudinal direction of portion 23B, along all or part of the length of portion 23B, along at least the entire length of portion 23B.

Advantage is here taken from the fact that strip 27 may be formed from semiconductor layer 5 (FIG. 1) already present under waveguide 23. For example, a germanium strip 27 may be formed by epitaxy from layer 5. A doped silicon strip 27 may then, for example, be formed by doping of a portion of layer 5 when the latter is made of silicon. A silicide strip 27 may, for example, be formed by silicidation of a portion of layer 5. Thus, strip 27 may be formed by providing a few additional steps only, or even no additional step, as compared with those already used in the manufacturing of the circuit of FIG. 1.

Strip 27 is preferably arranged at a distance from portion 23B such that a minimum quantity, for example, less than 5%, preferably less than 1%, of the power of the guided mode propagating in the waveguide is absorbed by strip 27. Strip 27 is arranged at a distance from portion 23B such that all or part of the power of a parasitic mode radiated from portion 23B, in particular from the lower surface of portion 23B in the present example, is absorbed by strip 27.

The device of FIGS. 3A and 3B also comprises a metal strip 29 absorbing light at the considered wavelengths. Strip 29 is at least partly arranged opposite portion 23B, in the present example above portion 23B. Strip 29 is here parallel to the plane of FIG. 3A. Strip 29 extends lengthwise parallel to the longitudinal direction of portion 23B, along all or part of the length of portion 23B, along at least the entire length of portion 23B.

Advantage is here taken from the fact that strip 29 may correspond to a metal layer portion 17 of one of the metallization levels of structure 13 (FIG. 1), for example, of one of the two metallization levels closest to components 1, 3 of the photonic circuit, preferably the second metallization level closest to these components. Thus, strip 29 may be formed by providing no additional step with respect to those already used in the manufacturing of the circuit of FIG. 1.

Strip 29 is preferably arranged at a distance from portion 23B such that a minimum quantity, for example, less than 5%, preferably less than 1%, of the power of the considered guided optical mode propagating in the waveguide is absorbed by strip 29. Strip 29 is arranged at a distance from portion 23B such that all or part of the power of a parasitic mode radiation from portion 23B, in particular from the upper surface of portion 23B in the present example, is absorbed by strip 29.

As for the embodiment of FIGS. 2A and 2B, it will be within the abilities of those skilled in the art to determine the dimensions and the relative arrangement of the elements of the filtering device of FIGS. 3A and 3B, based on the functional indications provided hereabove.

A transverse electric optical mode is here defined to be such that its electric field oscillates in a plane parallel to the plane shown in FIGS. 2A and 3A, in other words parallel to the upper surface of substrate 9 (FIG. 1), and perpendicularly to the propagation direction of the signal in the waveguide. A transverse electric optical mode is here defined to be such that its electric field oscillates in a plane perpendicular to the plane shown in FIGS. 2A and 3A, in other words perpendicular to the upper surface of substrate 9 (FIG. 1), and perpendicularly to the signal propagation direction in the waveguide. The embodiment described in relation with FIGS. 2A and 2B is particularly adapted to the case where the light signal to propagate through waveguide 23 is in the form of a transverse electric optical mode. The embodiment described in relation with FIGS. 3A and 3B is particularly adapted to the case where the light signal to propagate in waveguide 23 is in the form of a transverse electric optical mode. Indeed, in the embodiment of FIGS. 3A and 3B, strip 27 and/or strip 29 at least partly absorb the transverse magnetic parasitic modes.

As an example, waveguide 23 is made of silicon nitride, the layer 19 having the guide embedded therein being for example made of silicon oxide. An advantage of such a waveguide is that it is less sensitive to manufacturing and temperature variations, such a waveguide being for example particularly adapted to the forming of optical multiplexers and/or demultiplexers.

As a specific embodiment, a silicon nitride waveguide 23 embedded in a silicon oxide layer 19 is provided, with the following dimensions:

- maximum width of portions 23A and 23C in the range from 180 nm to 5 µm, preferably equal to approximately 700 nm, for example equal to 700 nm;
- width of portion 23B in the range from 180 nm to 5 µm, preferably equal to approximately 500 nm, for example, equal to 500 nm;
- height of portions 23A, 23B, and 23C in the range from 200 nm to 2 µm, preferably equal to approximately 600 nm, for example, equal to 600 nm;
- length of portions 23A and 23C in the range from 500 nm to 200 µm, preferably equal to approximately 10 µm, for example, equal to 10 µm;
- length of portion 23B in the range from 500 nm to 200 µm, preferably equal to approximately 25 µm, for example, equal to 25 µm;
- in a plane orthogonal to the vias, distance between two successive vias 21A, 21B, and/or 21B in the range from 100 nm to 5 µm, preferably approximately equal to 360 nm, for example, equal to 360 nm;
- in a plane orthogonal to the vias, distance between each via 21A, 21B, 21C and waveguide 23 in the range from 100 nm to 5 µm, preferably equal to approximately 500 nm (for example, equal to 500 nm) between vias 21B and portion 23B, and preferably ranging all the way to approximately 1.7 µm (for example, all the way to 1.7 µm) between vias 21A, 21C, and respective portions 23A and 23C;
- width of strip 29 in the range from 50 nm to 1 µm, for example, equal to approximately 300 nm, preferably to 200 nm; and
- width of strip 27 smaller than or equal to that of portion 23B, for example equal to approximately 400 nm, preferably to 400 nm.

Such a filtering device is adapted to wavelengths in the near infrared range, for example, in the range from 1 to 2 µm, preferably equal to approximately 1.3 µm or approximately 1.55 µm, for example, equal to 1.3 µm or 1.55 µm.

Simulations have shown that, when the fundamental mode of a signal having wavelengths in near infrared, polarized according to a transverse electric mode, propagates in guided fashion through the waveguide of FIGS. 2A-2B having the dimensions indicated hereabove, less than 0.1% of the power of the electric transverse fundamental mode is absorbed by the device and less than $10^{-3}$% of the power of this mode is reflected by the device.

Simulations have also shown that, when the fundamental mode of a signal having wavelengths in near infrared, polarized according to a transverse electric mode, propagates through the waveguide of FIGS. 3A-3B having the dimensions indicated hereabove, less than 1.5% of the power of the electric transverse fundamental mode is absorbed by the device and less than $10^{-3}$% of the power of this mode is reflected by the device. When the signal is polarized according to a transverse magnetic mode rather than a transverse electric mode, less than 3% of the power of the transverse magnetic fundamental mode is absorbed by the device and less than $10^{-4}$% of the power of this mode is reflected by the device.

Specific embodiments have been described. Various alterations, modifications, and improvements will occur to those skilled in the art. In particular, although a device comprising a strip 27 and a strip 29 has been described in relation with FIGS. 3A and 3B, it is possible for the device to comprise strip 27 or strip 29 only.

Strip 27 may be made of another material than those indicated hereabove as an example, provided that this material absorbs light at the considered wavelengths.

Vias 21A, 21B, and/or 21C, strip 27 and/or strip 29 may be electrically connected to a potential, typically, the ground, or may be left floating.

The embodiments described hereabove are not limited to the case of a waveguide such as illustrated in FIG. 1, and the waveguide may be formed in another insulating layer of the interconnection structure. More generally, it will be within the abilities of those skilled in the art to apply these embodiments to other waveguides of a photonic integrated circuit, particularly to waveguides made of other materials than those indicated hereabove as an example. For example, such embodiments apply to a waveguide made of amorphous silicon embedded in silicon oxide, silicon nitride, or silicon oxynitride (SiON), aluminum nitride (AlN), silicon carbonitride (SiCN), or also doped silicon oxides.

Further, the described embodiments may be adapted to wavelengths different than those indicated hereabove as an example, for example, to wavelengths compatible with a conventional photonic circuit, for example, in the range from approximately 400 nm to approximately 5 µm, for example from 400 nm to 5 µm, it being within the abilities of those skilled in the art to adapt the dimensions of the waveguide and the position of the vias, of strip 27, and/or of strip 29 relative to the waveguide according to the considered wavelength.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A device, comprising:
   an optical waveguide through which a light signal propagates; and
   a filtering device formed by a plurality of metal vias arranged along and on either side of a portion of the optical waveguide and configured to filter parasitic optical modes radiated from the optical waveguide;

wherein, in a plane orthogonal to the metal vias, a distance between the metal vias and said portion of the optical waveguide is shorter than a maximum distance beyond which power of a parasitic optical mode is smaller than −60 dB for the light signal to be propagated through the optical waveguide.

2. The device of claim 1, wherein dimensions of a transverse cross-section of said portion of the optical waveguide are substantially equal to dimensions of a transverse cross-section corresponding to a minimum effective area of a guided optical mode for the light signal to be propagated through the optical waveguide.

3. The device of claim 1, wherein the metal vias are configured to absorb less than 5% of power of a guided optical mode for the light signal to be propagated through the optical waveguide.

4. The device of claim 1, further comprising additional metal vias along and on either side of the optical waveguide both upstream and downstream of said portion of the optical waveguide.

5. The device of claim 1, wherein the metal vias are orthogonal to a same plane, said same plane being orthogonal to a transverse cross-section of said portion of the optical waveguide.

6. The device of claim 1, further comprising a metal strip parallel to a plane orthogonal to the metal vias, said metal strip arranged at least partly opposite said portion of the optical waveguide and configured to at least partly absorb parasitic optical modes radiated from said portion of the optical waveguide when the light signal propagates through the optical waveguide.

7. The device of claim 1, wherein the plurality of metal vias arranged along said portion of the optical waveguide are configured to at least partly absorb parasitic optical modes radiated from said portion of the optical waveguide when the light signal propagates through the optical waveguide.

8. The device of claim 1, further comprising an interconnection structure, with the optical waveguide being embedded in an insulating layer of the interconnection structure.

9. The device of claim 8, wherein the optical waveguide is made of silicon nitride and the insulating layer is made of silicon oxide.

10. A device, comprising:
an optical waveguide through which a light signal propagates; and
a filtering device formed by a plurality of metal vias arranged along and on either side of a portion of the optical waveguide and configured to filter parasitic optical modes radiated from the optical waveguide;
wherein, in a plane orthogonal to the metal vias, a distance between the metal vias and said portion of the optical waveguide is shorter than a maximum distance equal to 1.7 µm.

11. The device of claim 10, wherein dimensions of a transverse cross-section of said portion of the optical waveguide are substantially equal to dimensions of a transverse cross-section corresponding to a minimum effective area of a guided optical mode for the light signal to be propagated through the optical waveguide.

12. The device of claim 10, further comprising additional metal vias along and on either side of the optical waveguide both upstream and downstream of said portion of the optical waveguide.

13. The device of claim 10, wherein the metal vias are orthogonal to a same plane, said same plane being orthogonal to a transverse cross-section of said portion of the optical waveguide.

14. The device of claim 10, wherein the plurality of metal vias arranged along said portion of the optical waveguide are configured to at least partly absorb parasitic optical modes radiated from said portion of the optical waveguide when the light signal propagates through the optical waveguide.

15. A device, comprising:
an optical waveguide through which a light signal propagates; and
a filtering device formed by a plurality of metal vias arranged along and on either side of a portion of the optical waveguide and configured to filter parasitic optical modes radiated from the optical waveguide;
additional metal vias along and on either side of the optical waveguide both upstream and downstream of said portion of the optical waveguide;
wherein the additional metal vias along the optical waveguide both upstream and downstream of said portion of the optical waveguide are configured so that an effective index of a guided optical mode for the light signal to be propagated through the optical waveguide varies progressively toward said portion of the optical waveguide.

16. The device of claim 15, wherein dimensions of a transverse cross-section of said portion of the optical waveguide are substantially equal to dimensions of a transverse cross-section corresponding to a minimum effective area of a guided optical mode for the light signal to be propagated through the optical waveguide.

17. The device of claim 15, further comprising additional metal vias along and on either side of the optical waveguide both upstream and downstream of said portion of the optical waveguide.

18. The device of claim 15, wherein the metal vias are orthogonal to a same plane, said same plane being orthogonal to a transverse cross-section of said portion of the optical waveguide.

19. The device of claim 15, wherein the plurality of metal vias arranged along said portion of the optical waveguide are configured to at least partly absorb parasitic optical modes radiated from said portion of the optical waveguide when the light signal propagates through the optical waveguide.

20. A device, comprising:
an optical waveguide through which a light signal propagates; and
a filtering device formed by a plurality of metal vias arranged along and on either side of a portion of the optical waveguide and configured to filter parasitic optical modes radiated from the optical waveguide;
a strip of a material absorbing at wavelengths of the light signal to be transmitted by the optical waveguide, said strip of the material being parallel to a plane orthogonal to the metal vias, at least partly arranged opposite said portion of the optical waveguide and configured to at least partly absorb parasitic optical modes radiated from said portion of the optical waveguide when the light signal propagates through the optical waveguide.

21. The device of claim 20, wherein dimensions of a transverse cross-section of said portion of the optical waveguide are substantially equal to dimensions of a transverse cross-section corresponding to a minimum effective area of a guided optical mode for the light signal to be propagated through the optical waveguide.

22. The device of claim 20, further comprising additional metal vias along and on either side of the optical waveguide both upstream and downstream of said portion of the optical waveguide.

23. The device of claim 20, wherein the metal vias are orthogonal to a same plane, said same plane being orthogonal to a transverse cross-section of said portion of the optical waveguide.

24. The device of claim 20, wherein the plurality of metal vias arranged along said portion of the optical waveguide are configured to at least partly absorb parasitic optical modes radiated from said portion of the optical waveguide when the light signal propagates through the optical waveguide.

25. A device, comprising:
an optical waveguide through which a light signal propagates; and
a filtering device formed by a plurality of metal vias arranged along and on either side of a portion of the optical waveguide and configured to filter parasitic optical modes radiated from the optical waveguide;
wherein said portion of the optical waveguide extends between two additional portions of the optical waveguide, the two additional portions being configured so that an effective index of a guided optical mode of the light signal to be propagated through the optical waveguide varies progressively toward said portion of the optical waveguide.

26. The device of claim 25, wherein dimensions of a transverse cross-section of said portion of the optical waveguide are substantially equal to dimensions of a transverse cross-section corresponding to a minimum effective area of a guided optical mode for the light signal to be propagated through the optical waveguide.

27. The device of claim 25, further comprising additional metal vias along and on either side of the optical waveguide both upstream and downstream of said portion of the optical waveguide.

28. The device of claim 25, wherein the metal vias are orthogonal to a same plane, said same plane being orthogonal to a transverse cross-section of said portion of the optical waveguide.

29. The device of claim 25, wherein the plurality of metal vias arranged along said portion of the optical waveguide are configured to at least partly absorb parasitic optical modes radiated from said portion of the optical waveguide when the light signal propagates through the optical waveguide.

30. A device, comprising:
an optical waveguide;
a plurality of metal vias arranged extending along and on either side of a portion of the optical waveguide; and
a plurality of additional metal vias arranged extending along and on either side of the optical waveguide both upstream and downstream of said portion of the optical waveguide;
wherein the plurality of additional metal vias are configured so that an effective index of a guided optical mode of a light signal to be propagated through the optical waveguide varies progressively toward said portion of the optical waveguide.

31. The device of claim 30, wherein the metal vias and additional metal vias have a length which extends orthogonal to a same plane, said same plane being orthogonal to a transverse cross-section of said portion of the optical waveguide.

32. The device of claim 30, further comprising a metal strip extending parallel to a plane orthogonal to the metal vias and additional metal vias, said metal strip positioned at a location which is at least partly opposite said portion of the optical waveguide and which is configured to at least partly absorb parasitic optical modes radiated from said portion of the optical waveguide when the light signal propagates through the optical waveguide.

33. The device of claim 32, wherein the metal strip is positioned above said portion of the optical waveguide.

34. The device of claim 30, further comprising a strip of a material extending parallel to a plane orthogonal to the metal vias and additional metal vias, said strip positioned at a location which is at least partly opposite said portion of the optical waveguide and which is configured to at least partly absorb parasitic optical modes radiated from said portion of the optical waveguide when the light signal propagates through the optical waveguide.

35. The device of claim 34, wherein the strip is positioned below said portion of the optical waveguide.

36. The device of claim 30, wherein the metal vias extending along said portion of the optical waveguide are configured to at least partly absorb parasitic optical modes radiated from said portion of the optical waveguide when the light signal propagates through the optical waveguide.

37. The device of claim 30, wherein said portion of the optical waveguide extends between two additional portions of the optical waveguide, the two additional portions being configured so that the effective index of the guided optical mode of the light signal to be propagated through the optical waveguide varies progressively toward said portion of the optical waveguide; and wherein the plurality of additional metal vias extend along and on either side of the two additional portions.

* * * * *